United States Patent [19]

Dickerman et al.

[11] Patent Number: 4,849,295

[45] Date of Patent: Jul. 18, 1989

[54] HIGH TEMPERATURE METAL RUBBER GASKET

[75] Inventors: Randy L. Dickerman, Ypsilanti; Wayne R. Melchior, Roseville, both of Mich.

[73] Assignee: Eagle-Picher Industries, Inc., Cincinnati, Ohio

[21] Appl. No.: 131,755

[22] Filed: Dec. 11, 1987

[51] Int. Cl.$^4$ .............................................. B32B 15/04
[52] U.S. Cl. .................................. 428/457; 428/461; 428/472; 524/147; 524/271; 525/179; 525/211; 525/329.6
[58] Field of Search .................. 428/472, 461, 457; 525/211, 329.6, 179; 524/271, 147

[56] References Cited

U.S. PATENT DOCUMENTS

| | | | |
|---|---|---|---|
| 2,767,152 | 10/1956 | Bierman et al. | 524/271 |
| 2,957,784 | 10/1960 | Schiefelbein | 428/472 |
| 3,790,646 | 2/1974 | Ohishi et al. | 525/221 |
| 3,833,689 | 9/1974 | Usamoto et al. | 525/211 |
| 3,873,494 | 3/1975 | Lewis | 524/147 |
| 3,904,588 | 9/1975 | Greene | 525/329.6 |
| 3,922,421 | 11/1975 | Frank | 428/461 X |
| 3,950,281 | 4/1976 | Usamoto et al. | 525/211 |
| 3,976,724 | 8/1976 | Frank | 428/461 X |
| 4,591,615 | 5/1986 | Aldred et al. | 525/179 |

Primary Examiner—Thomas J. Herbert
Attorney, Agent, or Firm—Wood, Herron & Evans

[57] ABSTRACT

A metal rubber gasket includes a central metal lamina sandwiched by two outer elastomer layers. The elastomer is a blend of a butadiene-acrylonitrile rubber and a random terpolymer of ethylene, alkyl acrylate and the mono alkyl ester of a dioic acid. Preferably the butadiene-acrylonitrile rubber is functionally modified with polar groups such as a carboxyl, amine, or hydroxyl groups.

6 Claims, 1 Drawing Sheet

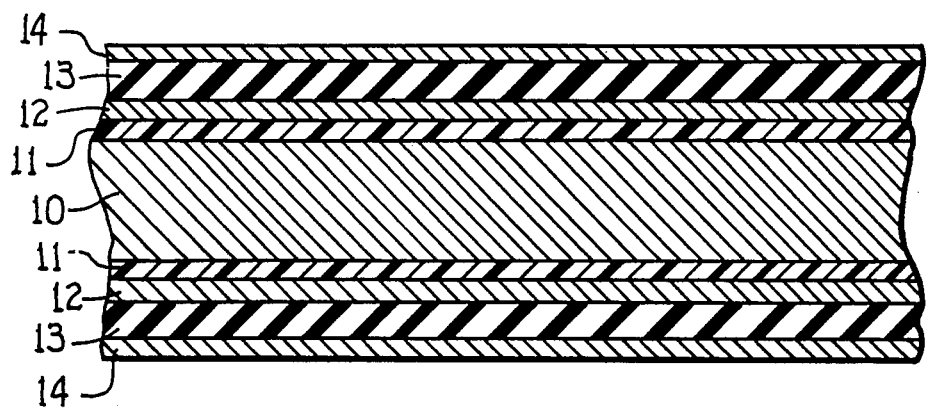

HIGH TEMPERATURE METAL RUBBER GASKET

Operating temperatures of automobile engines are increasing. This has created a need for a gasket material which can operate under high temperatures. Such gaskets must meet or exceed current performance standards and must do so at elevated temperatures. Basically, such gaskets must function at temperatures up to 575° F.

A high strength polymer/metal gasket material is described in U.S. Pat. No. 2,957,784. But the disclosed polymer could not function at high temperatures. There are many different polymers that can withstand such temperatures but they either lack the strength or the compression set necessary for these applications. Fluoroelastomers are suitable for such applications but these are quite expensive.

Blending polymers to form gasket material is known. For example, U.S. Pat. No. 2,957,784 discloses a gasket material formed from blended polymers. Also, Bierman U.S. Pat. No. 2,767,152 discloses the combination of a nitrile rubber with a butadiene styrene copolymer for use as a gasket material.

There are of course many disclosures of blends of polymers for various applications. Such patents include Usamoto et al U.S. Pat. Nos. 3,833,689 and 3,950,281 which disclose a combination of a nitrile rubber and an olefin/acrylate copolymer, Frank U.S. Pat. Nos. 3,976,724 and 3,922,421 which disclose a combination of nitrile rubber and an ethylene acrylic acid copolymer for use as an adhesive, Ohishi U.S. Pat. No. 3,790,646 which discloses a nitrile rubber modified with an acrylonitrile butadiene acrylic acid terpolymer to provide a solvent resistant elastomer. And further, Aldred U.S. Pat. No. 4,591,615 discloses a blend of a nitrile rubber with an ethylene acrylate copolymer to provide a thermoplastic elastomer. Also, Lewis U.S. Pat. No. 3,873,494 discloses an oil resistant, age resistant elastomeric product which is formed by the combination of a rubber and a terpolymer of ethylene, alkyl acrylate, and an alkyl ester or diester of butene dioic acid. These references disclose various applications for the blended polymers. There is no reason to assume or expect that any one of these formulations would provide a high temperature resistant gasket material.

One of the ways to modify existing nitrile rubber to improve upon its ability to withstand higher temperatures, is to introduce polar groups in the polymer backbone. Carboxylated nitrile rubber is more resistant to high temperatures than nitrile rubber without the carboxyl-groups. On the other hand, introduction of such polar groups will make the elastomer more rigid.

When forming a laminated gasket material, adhesion of the different lamina is also a significant concern. This becomes an even greater concern when the application is intended to withstand elevated temperatures. Of course, compression set is a critical factor. Other physical characteristics which must be considered are fuel, oil and engine coolant resistance of the elastomeric coating at the laminating point, resiliency, and tensile strength. All of these criteria must be met for a gasket to be suitable for high temperature automotive applications.

SUMMARY OF THE INVENTION

The present invention is premised on the realization that a high temperature resistant gasket material can be provided by laminating a base metal, preferably aluminum or steel to a polymeric layer. More particularly the invention is premised on the realization that such a laminated gasket can withstand high temperatures wherein the polymeric layer is a blend of a functionally modified butadiene acrylonitrile copolymer and a high temperature resistant polymer.

Even more specifically, the present invention is premised on the realization that a carboxylated butadiene acrylonitrile copolymer blended with a minor portion of a terpolymer formed from ethylene, alkyl acrylate and an alkyl ester of 1,4-butene-dioic acid provides a gasket material which can withstand high temperatures and yet possesses the necessary compression set and other characteristics required for gasket applications such as head gasket applications.

These and other advantages and objects of the present invention will be appreciated in light of the following detailed descriptions and drawings in which:

BRIEF DESCRIPTION OF THE FIGURE

The FIGURE is a perspective view partially broken away in cross-section of a sheet of gasket material of the present invention.

DETAILED DESCRIPTION OF THE INVENTION

The improved material as shown comprises a base sheet; 10 of metal. The composition of the metal affects only the mechanical properties of the product, i.e., strength, yield, etc., and not the effectiveness of the synthetic rubber bond. Generally the thickness of the metal base sheet 10 will be 0.005" to 0.024".

The FIGURE shows the application of preparatory and finish coatings to both sides of the base sheet 10, as usually desirable in gasket material. Certain gasket and other applications of the material may not require coating of both sides.

A coupling agent 11 is applied to base sheet 10. These are bond promoting agents which are well known in the industry such as silanes and titanates.

The coating 12 is a primer coating applied in lacquer form, with solids dissolved in appropriate solvents, to assist in obtaining adhesion or bonding of the main coating 13 to follow. Like coating 11, it is applied in a thickness of approximately 0.0005", or total of 0.001 inch for the two applications, then dried. It is a primer having a thermosetting phenolic resin and a compounded functionally modified butadiene-acrylonitrile copolymer, without curatives, as its principal component. Its approximate composition (in parts by weight) is:

Phenolic resin: 44–70
Compounded functionally modified butadiene-acrylonitrile copolymer: 21–32
Sulfur: 1–2
Additives: 6–34

The preferred composition is:
Phenolic resin: 52.9
Compounded functionally modified acrylonitrile: 25.8
Sulfur: 1.3
Additives: 22.0

By preference, the phenolic resin and acrylonitrile are present in an approximately 60:30 ratio. The phenolic resin is specifically a phenolic-formaldehyde resin, such as Durez 12987. The compounded acrylonitrile copolymer is prepared as a masterbatch of the following approximate composition:

| compounded functionally modified butadiene-acrylonitrile | Parts by Weight |
|---|---|
| (a) Functionally modified butadiene acrylonitrile copolymer | 55 to 60 |
| (b) Plasticizer | 0 to 10 |
| (c) Carbon black | 2.5 to 40 |
| (d) Antioxidant | 1 to 4 |
| (e) Stearic acid | 1 to 2 |
| (f) Retarders | 2 to 3 |

The preferred formulation is:

| | Parts by Weight |
|---|---|
| (a) Functionally modified butadiene acrylonitrile copolymer | 57.1 |
| (b) Plasticizer | 7.5 |
| (c) Carbon black | 28.3 |
| (d) Antioxidant | 3.3 |
| (e) Stearic acid | 1.4 |
| (f) Retarders | 2.4 |

The elastomer composition, termed, functionally modified butadiene-acrylonitrile copolymer is a butadiene-acrylonitrile rubber which is modified by the addition of polar groups to the polymer backbone. Specific polar functionalities include pendant carboxyl groups, amino groups and hydroxyl groups. This may be either solid or liquid at room temperature. Preferably there are 2-3 polar groups per molecule or about 0.075 polar groups per hundred weight resin. Carboxylated acrylonitrile butadiene rubbers are preferred and can be purchased. The preferred such rubber in the current formulation is Hycar 1072 sold by B.F. Goodrich.

Equivalent products of other producers may also be employed. Such equivalents are Paracol C produced by Naugatuck Chemicals, subsidiary of U.S. Rubber Company, butaprene NXM Chemicals, subsidiary of U.S. Rubber Company, butaprene NXM of Xylos Rubber Co., Division of Firestone Tire and Rubber Company, and the like.

The curative and accelerator agents are added during the preparation of primer coating 12 proper. Additives for primer coating 12 include epoxies, silanes or other filler materials, specifically epon 828, DER331, DER332, Al130 sold by Union Carbide, or S1590 sold by Petrile Chemicals. Depending on the type of substrate to be coated, any or all of these additives may be added. The use of these additives is well known in the industry.

The composition of coating 12 further should include one or more antioxidants such as phosphorous ester antioxidants, amine antioxidants and hindered phenolic antioxidants.

Preferred plasticizers and antioxidants are Plasthall, Polygard and Irganoz. Stearic acid serves as a lubricant and retarder, the carbon black is a reinforcing agent and filler, such as Raven 430 carbon black.

The phenolic resin nitrile composition is dissolved in a mixture of ketones such as methyl ethyl and methyl isobutyl ketones to produce the desired lacquer-like consistency for coating 12. Of course the degree of viscosity is widely controllable by varying the solvent present, and therefore the proportioning of solvent agents and their ratio by volume in the coating are matters of considerable choice, hence not unduly critical in the invention.

Coating 13 is applied as a viscous cement of approximately 15,000 cps. It is the synthetic rubber coating which gives the composite gasket material the desirable characteristics of compressibility and recovery necessary for establishing and maintaining a satisfactory seal for liquids, gases, etc.

Coating 13 is a blend of the functionally modified butadiene-acrylonitrile copolymer and a second polymer.

This second polymer is a random copolymer formed from ethylene, alkyl acrylate and a mono alkyl ester of 1,4-butene dioic acid. These can be formed by continuously feeding monomers and initiator to a stirred reaction zone and continuously withdrawing a reaction mixture containing the copolymer. Along with the monomers, 50 phr of fast extruding carbon black and 1.5 phr of hexamethylene diamine carbamate should be added. This is reacted for 30 minutes at 180° C. and 40,000 lbs. pressure.

Preferably the composition includes 40 to about 62% alkyl acrylate and 0.5 to 10% dioic acid ester. The dioic acid ester should be $C_1$-$C_6$ ester, preferably, methyl, ethyl or propyl hydrogen maleate.

Such a polymer is Vamac sold by E. I. DuPont. The method of making such a polymer is disclosed in U.S. Pat. No. 3,904,588, the disclosure of which is hereby incorporated by reference.

The random copolymer is blended with the carboxylated butadiene acrylonitrile copolymer. The percentage of random copolymer added will generally be about 2% to about 15%. These percentages are weight percentages. The blend will preferably include Carboxylated butadiene acrylonitrile: 44 to 64%
Acrylic Elastomer: 2 to 15%
Additives: to 100%

Additives include plasticizer, carbon black and other fillers, antioxidants, stearic acid or other external lubricants, sulfur and coupling agents.

The preferred formulation is:
Carboxylated functionally modified butadiene-acrylonitrile copolymer: 56.5
Plasticizer: 7.4
Carbon black: 27.9
Antioxidant: 3.3
Stearic Acid, 1.3
Sulfur 0.6
Acrylic Elastomer (Random Copolymer): 3.0

To this is added the cure package 1.88 parts 4,4'dithiomorpholine (accelerator), 1.99 parts tetraethylthiuramdisulfide coaccelerator and 4.9 parts ZnO.

The above compound, when in solution to provide the viscous cement consistency referred to constitutes coating 13. The usual solvent system employed is methyl isobutyl ketone and diisobutyl ketone in a 2.2:1 ratio by volume. Other systems may also be used, such as chlorinated aromatic hydrocarbons, ketones, nitromethane or nitroethane, and diluents may be aromatic hydrocarbons such as benzene, toluene or xylene.

Coating 13, as bonded and cured in the manner to be described, furnishes the desired sealing qualities, compression and recovery characteristics, oil and solvent resistance, etc., for the metal based material.

The final layer is a surface lubricant or adhesion preventing coating 14. This is applied as a dispersion, and may consist of wax, graphite (preferably colloidal), molybdenum-disulphide (also preferably colloidal) or equivalents for the purpose.

In producing the material whose components have been described, the aluminum or steel base 10 is cleaned in an alkaline cleaner at 180° to 200° F., followed by a water rinse. However, if the base sheet is very clean this may be omitted. The cleaned aluminum or steel is next deoxidized in a dilute sulphuric acid bath containing a hexavalent chromium salt. The metal base is again rinsed with water. A coupling agent 11 is then applied.

The resin-elastomer bond promoting coating 12 is applied in a lacquer form over coating 11, and is dried at about 200° F. as the web of the coated stock is continuously progressed past the coating and drying stations. As compounded in the manner described, it is capable of heat curing concurrently with the main synthetic rubber coating 13.

Coating 13 is applied as a viscous cement (approx. 15,000 cps.) by a knife spreader or roller coater on the advancing stock. This coating is dried at about 210°–220° F., depending on the nature of the solvent employed. As indicated, coatings 12 and 13 are compounded to cure concurrently, so as to insure a homogeneous polymerized final rubber film firmly bonded to the metal base. The cure cycle is carried out in a minimum of 6 minutes at 375°–400° F., with ample air circulation.

Next, coating 14 is applied in a dispersed form to the synthetic rubber coating and dried during the continuous travel of the stock. It prevents adhesion to adjoining metal surfaces in gasket applications.

The composite material produced by the above procedure has exceptional tensile and yield strength and is dimensionally stable. It provides excellent seals for oils, fuels, gases and other fluids, particularly refrigerants, at normal and elevated temperatures.

The superior quality of gaskets made according to the present invention will be appreciated in light of the following detailed example.

EXAMPLE 1

Following the procedure described earlier and using the preferred formulations listed, SAE 1008 steel in thicknesses from 0.002–0.010 inches and SAE 1010 steel in thicknesses from 0.011–0.032 inches were coated on both sides. Typical systems physical properties are presented in Table 1.

TABLE 1

| | |
|---|---|
| Compressibility, % (5,000 PSI) (ASTM F36A) | 5–10 |

TABLE 1-continued

| | |
|---|---|
| Recovery, % Min. (ASTM F36A) | 75 |
| Property Change in Immersion Media 22 hours (ASTM 146) | |
| (a) ASTM #3 Oil @ 149° C. Weight Change % Max. | 3.0 |
| (b) % Compressibility % Max. | 15 |
| (c) ASTM Fuel B @ 21-25° C. Weight Change % Max. | 5.0 |
| Heat Aged 1 hour @ 300° C. | |
| (a) Weight Change (Max.) | 1.00 |
| (b) % Compressibility | 10–20 |
| (c) Coating Adhesion (Min.) (ASTM 3359) | 4B |

The preceding has been a description of the present invention as well as the best mode of practicing the invention.

However, the invention defined by the appended claims wherein we claim:

1. A high temperature laminated gasket including a compressible polymeric layer adhered to a metal layer,
    said polymeric layer comprising a blend of a terpolymer comprising a random terpolymer of ethylene $C_1$-$C_6$, alkyl acrylate and $C_4$-$C_6$ monoalkyl ester of butene dioic acid and a second polymer comprising acrylonitrile butadiene,
    wherein said polymeric layer comprising 2–15% terpolymer, and 44–64% carboxylated acrylonitrile butadiene.

2. The laminated gasket claimed in claim 1 wherein said carboxylated acrylonitrile butadiene has at least two carboxyl groups per molecule.

3. The laminated gasket claimed in claim 1 wherein $C_1$-$C_6$ mono alkyl of 1,4-butene dioic acid is selected from the group consisting of methyl, butyl and propyl hydrogen maleate.

4. A gasket comprising a metal layer, a primer layer and compression layer
    said primer layer comprising a blend of phenol formaldehyde resin and acrylonitrile butadiene;
    said compression layer carboxylated acrylonitrile butadiene and a random copolymer of ethylene, $C_1$-$C_6$ alkyl acrylate and mono $C_1$-$C_6$ alkyl ester of a dioic acid wherein said compression layer comprises 2–15% terpolymer and 44–64% carboxylated acrylonitrile butadiene.

5. The gasket claimed in claim 4 whrein said carboxylated acrylonitrile butadiene has at least two carboxyl groups per molecule.

6. The laminated gasket claimed in claim 4 wherein $C_1$-$C_6$ mono alkyl ester of 1,4-butene dioic acid is selected from the group consisting of methyl, butyl and propyl hydrogen maleate.

* * * * *